(12) United States Patent
Kanemitsu et al.

(10) Patent No.: US 8,896,731 B2
(45) Date of Patent: Nov. 25, 2014

(54) IMAGE PROCESSING APPARATUS, IMAGE PROCESSING METHOD, AND CAMERA MODULE

(75) Inventors: Shiroshi Kanemitsu, Kanagawa (JP); Kazuhiro Tabuchi, Kanagawa (JP); Takaaki Kawakami, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 4 days.

(21) Appl. No.: 13/295,466

(22) Filed: Nov. 14, 2011

(65) Prior Publication Data

US 2012/0212643 A1    Aug. 23, 2012

(30) Foreign Application Priority Data

Feb. 17, 2011   (JP) .................................. 2011-032286

(51) Int. Cl.
*H04N 5/335* (2011.01)
*G06T 3/40* (2006.01)
*H04N 9/04* (2006.01)

(52) U.S. Cl.
CPC .............. *H04N 9/045* (2013.01); *G06T 3/4007* (2013.01); *H04N 2209/046* (2013.01)
USPC .......................................... 348/273; 348/237

(58) Field of Classification Search
None
See application file for complete search history.

(56) References Cited

U.S. PATENT DOCUMENTS

| | | | | |
|---|---|---|---|---|
| 6,933,971 | B2* | 8/2005 | Bezryadin | 348/280 |
| 7,053,944 | B1* | 5/2006 | Acharya et al. | 348/273 |
| 7,142,239 | B2* | 11/2006 | Cho | 348/273 |
| 7,609,307 | B2* | 10/2009 | Tsai et al. | 348/273 |
| 8,270,713 | B2* | 9/2012 | Quan | 382/167 |
| 8,340,407 | B2* | 12/2012 | Kalman | 382/162 |
| 8,564,680 | B1* | 10/2013 | Aldrich et al. | 348/222.1 |
| 2003/0086009 | A1* | 5/2003 | Yeh | 348/273 |
| 2003/0164886 | A1* | 9/2003 | Chen | 348/272 |
| 2005/0200733 | A1* | 9/2005 | Malvar | 348/272 |
| 2007/0013794 | A1* | 1/2007 | Tsuruoka | 348/241 |
| 2009/0066821 | A1* | 3/2009 | Achong et al. | 348/273 |
| 2009/0091646 | A1* | 4/2009 | Manabe | 348/273 |
| 2009/0295934 | A1* | 12/2009 | Au et al. | 348/222.1 |
| 2011/0032396 | A1* | 2/2011 | Park et al. | 348/273 |
| 2011/0122273 | A1 | 5/2011 | Kanemitsu et al. | |

FOREIGN PATENT DOCUMENTS

| | | | |
|---|---|---|---|
| JP | 3-259687 | | 11/1991 |
| JP | 11220745 | A * | 8/1999 |
| JP | 2001-197512 | | 7/2001 |

(Continued)

OTHER PUBLICATIONS

Author: Yamamoto et al., Title: Device and Method for Camera Signal Processing, Date: Aug. 10, 1999, Translation of JP 11220745 A.*

(Continued)

*Primary Examiner* — Twyler Haskins
*Assistant Examiner* — Wesley J Chiu
(74) *Attorney, Agent, or Firm* — Oblon, Spivak, McClelland, Maier & Neustadt, L.L.P.

(57) ABSTRACT

According to one embodiment, an image processing apparatus includes a pixel interpolation unit. The pixel interpolation unit includes a calculating unit that adds, to a first frequency band component, a second frequency band component in a direction in which the amount of change in the sensitivity level value of an acquired color component is determined to be small. The second frequency band component is in a frequency band higher than the first frequency band component.

20 Claims, 9 Drawing Sheets

(56) References Cited

FOREIGN PATENT DOCUMENTS

| JP | 2006-262167 | 9/2006 |
|---|---|---|
| JP | 2008-42313 | 2/2008 |
| JP | 2009-95005 | 4/2009 |
| JP | 2010-28373 | 2/2010 |
| JP | 2010-93336 | 4/2010 |

OTHER PUBLICATIONS

Office Action issued Jan. 7, 2014 in Japanese Application No. 2011-032286 (With English Translation).

* cited by examiner

FIG.4

| R1 | G1  | R2 | G2  | R3 |
|----|-----|----|-----|----|
| G3 | B1  | G4 | B2  | G5 |
| R4 | G6  | R5 | G7  | R6 |
| G8 | B3  | G9 | B4  | G10|
| R7 | G11 | R8 | G12 | R9 |

FIG.5

| G1  | R1 | G2  | R2 | G3  |
|-----|----|-----|----|-----|
| B1  | G4 | B2  | G5 | B3  |
| G6  | R3 | G7  | R4 | G8  |
| B4  | G9 | B5  | G10| B6  |
| G11 | R5 | G12 | R6 | G13 | ns
IMAGE PROCESSING APPARATUS, IMAGE PROCESSING METHOD, AND CAMERA MODULE

CROSS-REFERENCE TO RELATED APPLICATIONS

This application is based upon and claims the benefit of priority from Japanese Patent Application No. 2011-32286, filed on Feb. 17, 2011; the entire contents of all of which are incorporated herein by reference.

FIELD

Embodiments described herein relate generally to an image processing apparatus, an image processing method, and a camera module.

BACKGROUND

A so-called single-chip imaging apparatus, which is one kind of full color imaging apparatus, is applied in order to reduce the structure and manufacturing costs of an imaging apparatus, such as a household digital still camera or a mobile phone with a camera. In the single-chip imaging apparatus, color filters for red (R), green (G), and blue (B) are provided on the corresponding photo-electric conversion elements and the sensitivity signal of an insufficient color component is calculated for the position of each pixel, thereby obtaining the image signals of a plurality of colors from one two-dimensional imaging device. The sensitivity level value of the insufficient color component is generated by an interpolation process using the known sensitivity level values of a pixel of attention and the peripheral pixels thereof.

In order to generate the sensitivity level value of the insufficient color component, for example, a method has been used which extracts a low-frequency component and a high-frequency component from the image signal and adds the extracted frequency components. The addition of the high-frequency component makes it possible to prevent the deterioration of resolution and thus obtain a high-resolution image subjected to a pixel interpolation process. The correlation among RGB color components is a precondition for the interpolation process. For example, the correlation may not be established in the vicinity of the edge of the image due to the aberration of a lens or blurring. The interpolation process involving the breaking of the correlation is called zipper noise, which causes a dotted-line-shaped noise which is absent in the object.

BRIEF DESCRIPTION OF THE DRAWINGS

FIG. 4 is a diagram illustrating the arrangement of a pixel of attention and peripheral pixels when an R pixel is the pixel of attention;

FIG. 5 is a diagram illustrating the arrangement of the pixel of attention and the peripheral pixels when a G pixel is the pixel of attention;

DETAILED DESCRIPTION

In general, according to one embodiment, an image processing apparatus includes a pixel interpolation unit. The pixel interpolation unit performs an interpolation process on a sensitivity level value of an acquired color component of each pixel in an image signal which is acquired by an imaging operation. The pixel interpolation unit generates a sensitivity level value of an insufficient color component of each pixel. The pixel interpolation unit includes a change amount calculating unit, a change amount comparison unit, and a calculating unit. The change amount calculating unit calculates the amount of change in the sensitivity level value of the acquired color component in a pixel of attention and peripheral pixels. The change amount calculating unit calculates the amount of change in each direction based on the pixel of attention. The pixel of attention is a target pixel in which the sensitivity level value of the insufficient color component is generated. The peripheral pixels are pixels disposed in the periphery of the pixel of attention. The change amount comparison unit compares the amounts of change calculated by the change amount calculating unit in two directions. The two directions are preset according to the insufficient color component of the pixel of attention. The calculating unit adds a first frequency band component and a second frequency band component of the image signal. The calculating unit adds the first and second frequency band components to generate the sensitivity level value of the insufficient color component of the pixel of attention. The second frequency band component is a component in a frequency band higher than the first frequency band component. The calculating unit adds, to the first frequency band component, the second frequency band component in one of the two directions in which the amount of change is determined to be small by the comparison of the change amount comparison unit.

Exemplary embodiments of an image processing apparatus, an image processing method, and a camera module will be explained below in detail with reference to the accompanying drawings. The present invention is not limited to the following embodiments.

Figure 1:
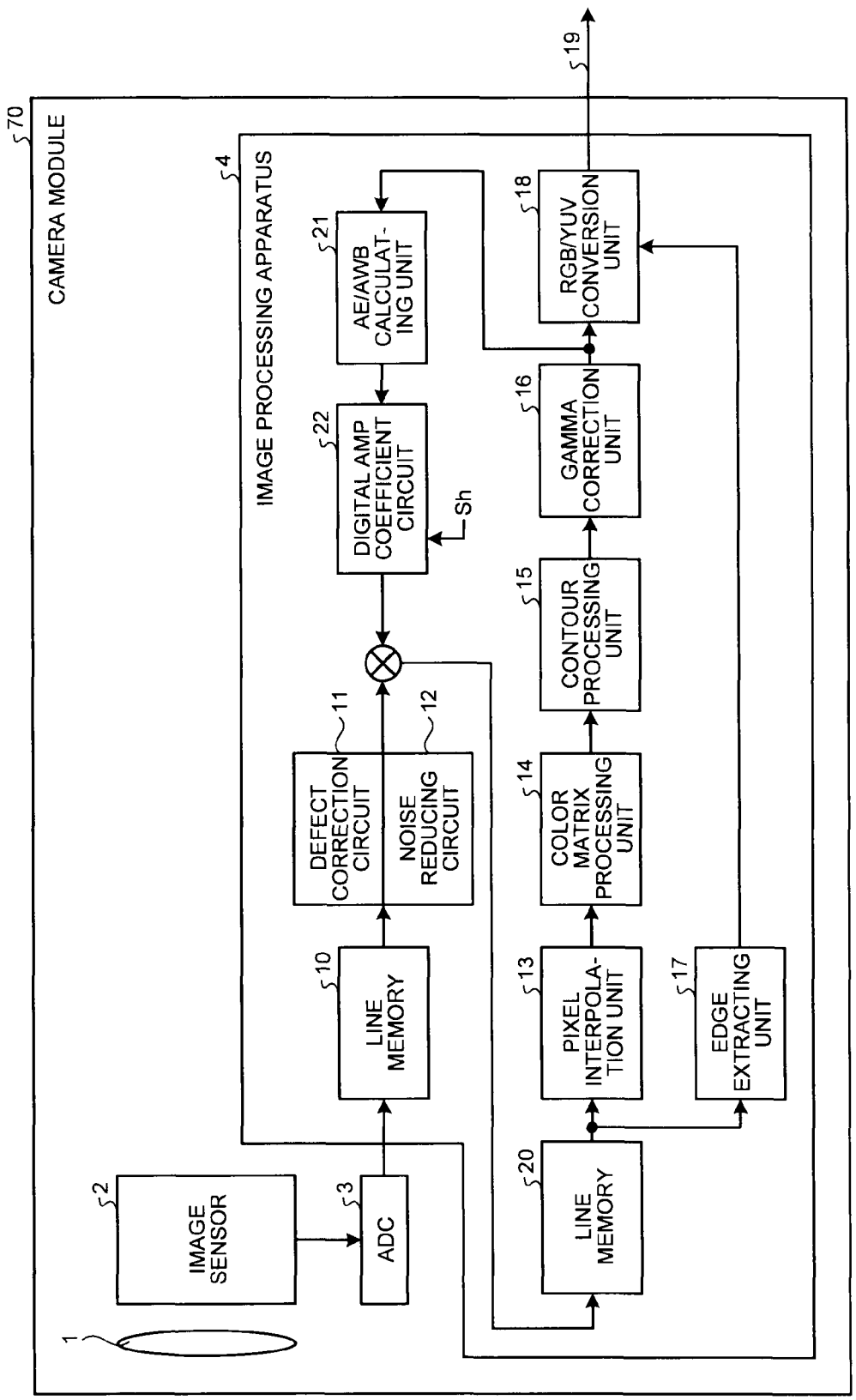
FIG. 1 is a block diagram illustrating the structure of a camera module including an image processing apparatus according to a first embodiment.
Figure 2:
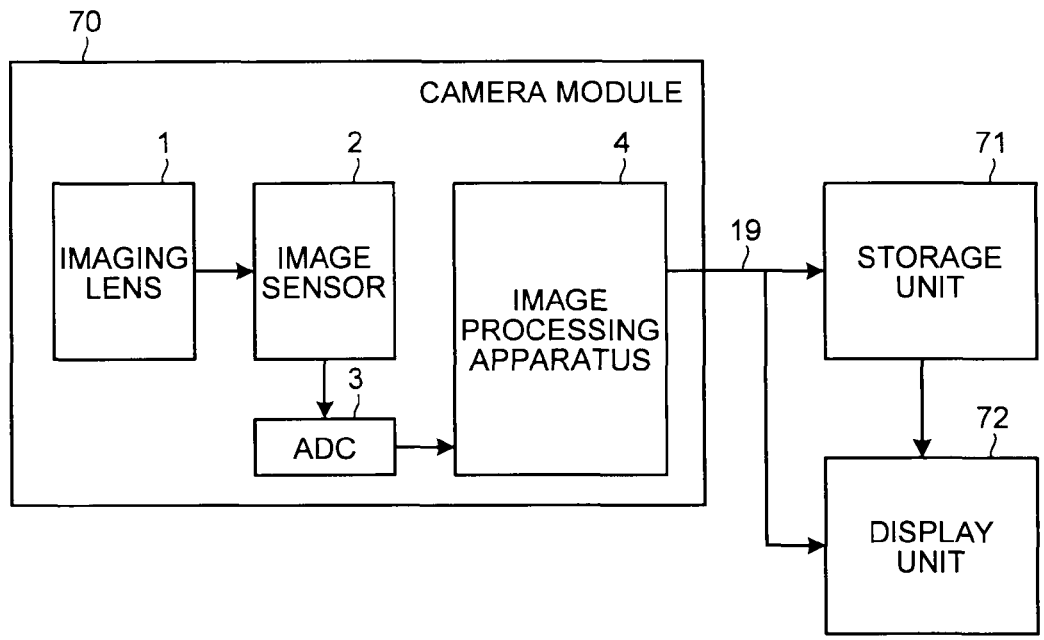
FIG. 2 is a block diagram illustrating the structure of a digital camera, which is an electronic apparatus including the camera module shown in FIG. 1.

FIG. 1 is a block diagram illustrating the structure of a camera module including an image processing apparatus according to a first embodiment. FIG. 2 is a block diagram illustrating the structure of a digital camera, which is an electronic apparatus including the camera module shown in FIG. 1.

The digital camera includes a camera module 70, a storage unit 71, and a display unit 72. The camera module 70 includes an imaging lens 1, an image sensor 2, an analog-to-digital converter (ADC) 3, and an image processing apparatus 4.

An image signal 19 output from the camera module 70 is input to the display unit 72 directly or through the storage unit 71. The storage unit 71 stores the image captured by the camera module 70. The display unit 72 displays an image corresponding to the image signal 19 output from the camera module 70 or the storage unit 71. The display unit 72 is, for example, a liquid crystal display. The display unit 72 displays the image that is being captured according to the image signal 19 output from the camera module 70. In addition, the display unit 72 displays the image stored in the storage unit 71 according to the image signal 19 output from the storage unit 71. The camera module 70 may be applied to electronic apparatuses other than the digital camera. For example, the camera module 70 may be applied to a mobile phone with a camera.

The imaging lens 1 receives light from an object and forms an object image on the image sensor 2. The image sensor 2 converts the light received by the imaging lens 1 into signal charge and captures the object image. The image sensor 2 acquires RGB signal values in the order corresponding to a Bayer array and generates an analog image signal. The ADC 3 converts the analog image signal from the image sensor 2 into a digital image signal. The image processing apparatus 4 performs various kinds of image processing on the digital image signal from the ADC 3.

A line memory 10 temporarily stores the digital image signal from the ADC 3. A defect correction circuit 11 and a noise reducing circuit 12 share the line memory 10. The defect correction circuit 11 performs a defect correction process of correcting a defective portion (defect) of the digital image signal due to the pixel which is not normally operated in the image sensor 2 on the digital image signal from the line memory 10. The noise reducing circuit 12 performs a noise cancellation process of reducing noise.

A digital amplifier (AMP) coefficient circuit 22 calculates a digital AMP coefficient on the basis of a coefficient calculated by an AE/AWB calculating circuit 21, which will be described below, and a shading correction coefficient Sh for correcting the shading of the object image. The digital AMP coefficient circuit 22 multiplies the digital image signal processed by the defect correction circuit 11 and the noise reducing circuit 12 by the digital AMP coefficient.

A line memory 20 temporarily stores the digital image signal multiplied by the digital AMP coefficient. A pixel interpolation unit 13 performs a process (demosaic process) of interpolating the sensitivity level value of the acquired color component of each pixel in the digital image signals which are transmitted from the line memory 20 in the order corresponding to the Bayer array and generates the sensitivity level value of an insufficient color component of each pixel. A color matrix processing unit 14 performs a color matrix calculating process (color reproducibility process) for obtaining color reproducibility.

A contour processing unit 15 performs a contour enhancement process using a correction coefficient which is calculated on the basis of the imaging conditions of the image sensor 2 and the position of each pixel. A gamma correction unit 16 performs a gamma correction process of correcting the gradation of the image. An RGB/YUV conversion unit 18 generates a brightness (Y) signal and a color difference (UV) signal from RGB sensitivity signals and converts the image signal from an RGB format into a YUV format (for example, YUV422). The RGB/YUV conversion unit 18 converts the RGB image signals into YUV output image signals 19.

An edge extracting unit 17 performs an edge extracting process on the digital image signals which are transmitted from the line memory 20 in the order corresponding to the Bayer array and outputs the extraction result to the RGB/YUV conversion unit 18. The AE/AWB calculating circuit 21 calculates coefficients for adjusting auto exposure (AE) and auto white balance (AWB).

Figure 3:
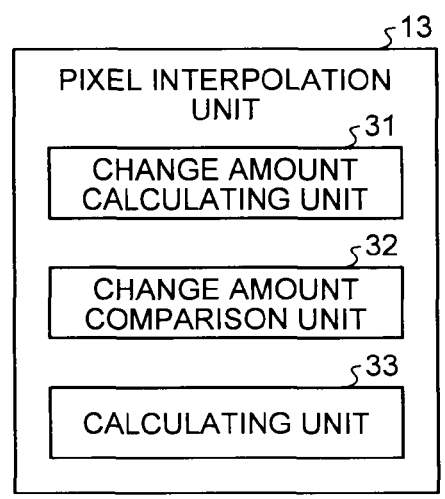
FIG. 3 is a block diagram illustrating the schematic structure of a pixel interpolation unit.

FIG. 3 is a block diagram illustrating the schematic structure of the pixel interpolation unit. The pixel interpolation unit 13 includes a change amount calculating unit 31, a change amount comparison unit 32, and a calculating unit 33. The change amount calculating unit 31 calculates the amount of change in the sensitivity level values of the acquired color components of the pixel of attention and the peripheral pixels in each direction based on the pixel of attention. The pixel of attention is a target pixel in which the sensitivity level value of an insufficient color component is generated. The peripheral pixels are disposed in the periphery of the pixel of attention.

The change amount comparison unit 32 compares the amounts of change calculated by the change amount calculating unit 31 in two predetermined directions which are predetermined according to the insufficient color component of the pixel of attention. The calculating unit 33 adds a low-frequency component and a high-frequency component of the image signal to generate the sensitivity level value of the insufficient color component of the pixel of attention. The low-frequency component is a first frequency band component. The high-frequency component is a second frequency band component in a frequency band higher than the first frequency band component.

FIG. 4 is a diagram illustrating the arrangement of the pixel of attention and the peripheral pixels when an R pixel is the pixel of attention. A color filter that selectively transmits R light is provided on the R pixel and the R pixel has R as the acquired color component and G and B as the insufficient color components. A color filter that selectively transmits G light is provided on a G pixel and the G pixel has G as the acquired color component and R and B as the insufficient color components. A color filter that selectively transmits B light is provided on a B pixel and the B pixel has B as the acquired color component and R and G as the insufficient color components.

The pixel interpolation unit 13 receives data corresponding to a total of five lines, that is, data corresponding four lines stored in the line memory 20 (see FIG. 1) and previous data corresponding to one line input to the line memory 20. It is assumed that 5×5 pixels are arranged in a matrix in the horizontal (H) direction and the vertical (V) direction and the pixel disposed at the center of the matrix is the pixel of attention. In the example shown in FIG. 4, a pixel R5, which is an R pixel, is the pixel of attention. Among the 5×5 pixels, 24 pixels other than the pixel R5 are the peripheral pixels.

The change amount calculating unit 31 (see FIG. 3) calculates the amounts of change in the sensitivity level value of the acquired color component in four directions based on the pixel R5, that is, the H direction, the V direction, a DL direction, and a DR direction in the two-dimensional arrangement of the pixels. The H direction is a first direction. The V direction is a second direction vertical to the first direction. The DL direction is a third direction that is inclined with respect to the first direction and the second direction. The DR direction is a fourth direction that is inclined with respect to the first direction and the second direction and is different from the third direction.

In FIG. 4, the H direction is the left-right direction. The V direction is the up-down direction. The DL direction is a direction that is inclined toward the upper left side. The DR direction is a direction that is inclined toward the upper right side.

The change amount calculating unit 31 calculates the amount Mh of change in the H direction, the amount Mv of change in the V direction, the amount Mdl of change in the DL direction, and the amount Mdr of change in the DR direction using, for example, the following Expressions 1 to 4.

$$Mh=|2\times R5-R4-R6|+|G6-G7| \qquad \text{[Expression 1]}$$

$$Mv=|2\times R5-R2-R8|+|G4-G9| \qquad \text{[Expression 2]}$$

$$Mdl=|2\times R5-R1-R9|+|B1-B4| \qquad \text{[Expression 3]}$$

$$Mdr=|2\times R5-R3-R7|+|B2-B3| \qquad \text{[Expression 4]}$$

In Expressions 1 to 4, the "R5", "R2", . . . terms indicate the sensitivity level values of the acquired color components of the pixels R5, R2, . . . shown in FIG. 4, respectively. A method of calculating the amounts Mh, Mv, Mdl, and Mdr of change is not limited to the method using the above-mentioned Expressions 1 to 4. The change amount calculating unit 31 may calculate the amounts Mh, Mv, Mdl, and Mdr of change using any other methods.

When the sensitivity level value of a G component, which is an insufficient color component of the pixel R5, is calculated, the change amount comparison unit 32 compares the amounts Mh and Mv of change in the H direction and the V direction in which the G pixels are arranged with the pixel R5 as the center. The two directions in which the change amount comparison unit 32 compares the amounts of change are preset according to the acquired color component of the pixel of attention and the insufficient color component whose sensitivity level value is calculated.

When the difference between the amount Mh of change and the amount Mv of change is small, a portion of the object corresponding to the pixel R5 and the periphery thereof are likely to be flat portions having a small variation in the signal level in both the H direction and the V direction or high frequency regions having a large variation in the signal level in both the H direction and the V direction.

When the difference between the amount Mh of change and the amount Mv of change is less than a predetermined difference threshold value Th1, the calculating unit 33 performs linear interpolation on the sensitivity level values of the pixels of the same color which have the G component as the acquired color component, among the peripheral pixels. The calculating unit 33 uses a low-pass filter (LPF) in the linear interpolation. In this way, the pixel interpolation unit 13 can avoid the problem in that noise is emphasized due to the addition of a high-frequency component or it is difficult to accurately extract a high-frequency component.

In this embodiment, it is assumed that the high frequency region is a frequency band in the vicinity of a Nyquist frequency. In the high frequency region, aliasing distortion occurs and it may be difficult to calculate the accurate amount of change. When an imaging lens 1 including an optical LPF is used, it is possible to reduce the aliasing distortion. However, in the structure of an inexpensive camera module, when an imaging lens 1 without the optical LPF is used, the aliasing distortion is likely to occur. Therefore, the pixel interpolation unit 13 may appropriately change the difference threshold value Th1 compared with the difference between the amounts of change in two directions, according to the structure of the imaging lens 1.

When the difference between the amount Mh of change and the amount Mv of change is large, the edge is likely to be in a portion of the object corresponding to the pixel R5 and the periphery thereof. When the difference between the amount Mh of change and the amount Mv of change is more than the predetermined difference threshold value Th1, the calculating unit 33 adds, to a low-frequency component, a high-frequency component in one of the H direction and the V direction in which the amount of change is determined to be small by the comparison of the change amount comparison unit 32. The calculating unit 33 performs linear interpolation on the sensitivity level values of the pixels of the same color which have the G component as the acquired color component, among the peripheral pixels, thereby calculating the low-frequency component.

When the difference between the amount Mh of change and the amount Mv of change is more than the difference threshold value Th1 and the amount Mv of change is more than the amount Mh of change, the calculating unit 33 adds the high-frequency component in the H direction to the low-frequency component. When the difference between the amount Mh of change and the amount Mv of change is more than the difference threshold value Th1 and the amount Mh of change is more than the amount Mv of change, the calculating unit 33 adds the high-frequency component in the V direction to the low-frequency component.

When the sensitivity level value of a B component, which is an insufficient color component of the pixel R5, is calculated, the change amount comparison unit 32 compares the amounts Mdl and Mdr of change in the DL direction and the DR direction in which the B pixels are arranged with the pixel R5 as the center. When the difference between the amount Mdl of change and the amount Mdr of change is less than the predetermined difference threshold value Th1, the calculating unit 33 performs linear interpolation on the sensitivity level values of the pixels of the same color which have the B component as the acquired color component, among the peripheral pixels.

When the difference between the amount Mdl of change and the amount Mdr of change is more than the difference threshold value Th1 and the amount Mdr of change is more than the amount Mdl of change, the calculating unit 33 adds the high-frequency component in the DL direction to the low-frequency component. When the difference between the amount Mdl of change and the amount Mdr of change is more than the difference threshold value Th1 and the amount Mdl of change is more than the amount Mdr of change, the calculating unit 33 adds the high-frequency component in the DR direction to the low-frequency component.

Next, an example of calculating the sensitivity level value of the insufficient color component when the R pixel is the pixel of attention will be described. When the difference between the amount Mh of change and the amount Mv of change is equal to or less than the difference threshold value Th1, the calculating unit 33 calculates the sensitivity level value Ga of the G component using the following Expression 5.

$$Ga=(G4+G6+G7+G9)/4 \qquad \text{[Expression 5]}$$

In Expression 5, the (G4+G6+G7+G9)/4 term corresponds to the low-frequency component of the image signal extracted in the H direction and the V direction.

When the difference between the amount Mh of change and the amount Mv of change is more than the difference threshold value Th1 and the amount Mv of change is more than the amount Mh of change, the calculating unit 33 calculates the sensitivity level value Gb of the G component using the following Expression 6.

$$Gb=(G6+G7)/2+(2\times R5-R4-R6)/2\times AA \qquad \text{[Expression 6]}$$

In Expression 6, the (G6+G7)/2 term corresponds to the low-frequency component of the image signal extracted in the H direction. The (2×R5−R4−R6)/2 term corresponds to the high-frequency component of the image signal extracted in the H direction. The coefficient AA multiplied by the term of the high-frequency component is a high-frequency addition coefficient for adjusting a weight of the high-frequency component with respect to the low-frequency component. The high-frequency addition coefficient AA is arbitrarily set and can be appropriately adjusted. The high-frequency addition coefficient AA may be 1.

When the difference between the amount Mh of change and the amount Mv of change is more than the difference threshold value Th1 and the amount Mh of change is more than the amount Mv of change, the calculating unit 33 calculates the sensitivity level value Gc of the G component using the following Expression 7.

$$Gc=(G4+G9)/2+(2\times R5-R2-R8)/2\times AA \quad \text{[Expression 7]}$$

In Expression 7, the (G4+G9)/2 term corresponds to the low-frequency component of the image signal extracted in the V direction. The (2×R5−R2−R8)/2 term corresponds to the high-frequency component of the image signal extracted in the V direction.

When the difference between the amount Mdl of change and the amount Mdr of change is equal to or less than the difference threshold value Th1, the calculating unit 33 calculates the sensitivity level value Ba of the B component using the following Expression 8.

$$Ba=(B1+B2+B3+B4)/4. \quad \text{[Expression 8]}$$

In Expression 8, the (B1+B2+B3+B4)/4 term corresponds to the low-frequency component of the image signal extracted in the DL direction and the DR direction.

When the difference between the amount Mdl of change and the amount Mdr of change is more than the difference threshold value Th1 and the amount of Mdr change is more than the amount Mdl of change, the calculating unit 33 calculates the sensitivity level value Bb of the B component using the following Expression 9.

$$Bb=(B1+B4)/2+(2\times R5-R1-R9)/2\times AA \quad \text{[Expression 9]}$$

In Expression 9, the (B1+B4)/2 term corresponds to the low-frequency component of the image signal extracted in the DL direction. The (2×R5−R1−R9)/2 term corresponds to the high-frequency component of the image signal extracted in the DL direction.

When the difference between the amount Mdl of change and the amount Mdr of change is more than the difference threshold value Th1 and the amount Mdl of change is more than the amount Mdr of change, the calculating unit 33 calculates the sensitivity level value Bc of the B component using the following Expression 10.

$$Bc=(B2+B3)/2+(2\times R5-R3-R7)/2\times AA \quad \text{[Expression 10]}$$

In Expression 10, the (B2+B3)/2 term corresponds to the low-frequency component of the image signal extracted in the DR direction. The (2×R5−R3−R7)/2 term corresponds to the high-frequency component of the image signal extracted in the DR direction.

Next, a case in which the B pixel is the pixel of attention will be described. When the sensitivity level value of a G component, which is an insufficient color component of the B pixel, is calculated, the change amount comparison unit 32 compares the amounts Mh and My of change in the H direction and the V direction in which the G pixels are arranged with the B pixel as the center. When the B pixel is the pixel of attention, the calculating unit 33 calculates the sensitivity level value of the G component using the same method as that used when the R pixel is the pixel of attention.

When the sensitivity level value of an R component, which is an insufficient color component of the B pixel, is calculated, the change amount comparison unit 32 compares the amounts Mdl and Mdr of change in the DL direction and the DR direction in which the R pixels are arranged with the B pixel as the center. When the B pixel is the pixel of attention, the calculating unit 33 calculates the sensitivity level value of the R component using the same method of calculating the sensitivity level value of the B component as that used when the R pixel is the pixel of attention.

Next, a case in which the G pixel is the pixel of attention will be described. FIG. 5 is a diagram illustrating the arrangement of the pixel of attention and the peripheral pixels thereof when the G pixel is the pixel of attention. In the example shown in FIG. 5, it is assumed that a pixel G7, which is a G pixel, is the pixel of attention and 24 pixels other than the pixel G7 are the peripheral pixels among 5×5 pixels.

The change amount calculating unit 31 (see FIG. 3) calculates the amounts of change in the sensitivity level value of the acquired color component in two directions, that is, the H direction and the V direction based on the pixel G7. The change amount calculating unit 31 calculates the amount Mh of change in the H direction and the amount Mv of change in the V direction using, for example, the same expresses as the above-mentioned Expressions 1 and 2.

When the sensitivity level values of the B and R components, which are the insufficient color components of the pixel G7, are calculated, the change amount comparison unit 32 compares the amounts Mh and Mv of change in the H direction in which the R pixels are arranged with the pixel G7 as the center and the V direction in which the B pixels are arranged with the pixel G7 as the center.

When the difference between the amount Mh of change and the amount Mv of change is less than the predetermined difference threshold value Th1, the calculating unit 33 performs linear interpolation on the sensitivity level values of the pixels of the same color which have the B component as the acquired color component, among the peripheral pixels. The calculating unit 33 performs linear interpolation on the sensitivity level values of the pixels of the same color which have the R component as the acquired color component, among the peripheral pixels. The calculating unit 33 uses a low-pass filter (LPF) in the linear interpolation.

When the difference between the amount Mh of change and the amount Mv of change is more than the difference threshold value Th1, the calculating unit 33 adds, to the low-frequency component, the high-frequency component in one of the H direction and the V direction in which the amount of change is determined to be small by the comparison of the change amount comparison unit 32. The calculating unit 33 performs linear interpolation on the sensitivity level values of the pixels of the same color which have the B component as the acquired color component among the peripheral pixels, thereby calculating the low-frequency component of the B component. The calculating unit 33 performs linear interpolation on the sensitivity level values of the pixels of the same color which have the R component as the acquired color component among the peripheral pixels, thereby calculating the low-frequency component of the R component.

When the difference between the amount Mh of change and the amount MY of change is more than the difference threshold value Th1 and the amount Mv of change is more than the amount Mh of change, the calculating unit 33 adds the high-frequency component in the H direction to the low-frequency component. When the difference between the amount Mh of change and the amount Mv of change is more than the difference threshold value Th1 and the amount Mh of change is more than the amount Mv of change, the calculating unit 33 adds the high-frequency component in the V direction to the low-frequency component.

Next, an example of calculating the sensitivity level value of an insufficient color component when the G pixel is the pixel of attention will be described. When the difference between the amount Mh of change and the amount Mv of change is equal to or less than the difference threshold value Th1, the calculating unit 33 calculates the sensitivity level value Ba of the B component using the following Expression 11. The calculating unit 33 calculates the sensitivity level value Ra of the R component using the following Expression 12.

$$Ba=(B2+B5)/2 \qquad \text{[Expression 11]}$$

$$Ra=(R3+R4)/2 \qquad \text{[Expression 12]}$$

In Expression 11, the (B2+B5)/2 term corresponds to the extracted low-frequency component of the image signal. In Expression 12, the (R3+R4)/2 term corresponds to the extracted low-frequency component of the image signal.

When the difference between the amount Mh of change and the amount Mv of change is more than the difference threshold value Th1 and the amount Mv of change is more than the amount Mh of change, the calculating unit 33 calculates the sensitivity level value Bb of the B component using the following Expression 13. The calculating unit 33 calculates the sensitivity level value Rb of the R component using the following Expression 14.

$$Bb=(B2+B5)/2+(2\times G7-G6-G8)/2\times AA \qquad \text{[Expression 13]}$$

$$Rb=(R3+R4)/2+(2\times G7-G6-G8)/2\times AA \qquad \text{[Expression 14]}$$

Each of the (B2+B5)/2 term in Expression 13 and the (R3+R4)/2 term in Expression 14 corresponds to the extracted low-frequency component of the image signal, similarly to Expressions 11 and 12. In Expressions 13 and 14, the (2×G7−G6−G8)/2 term corresponds to the high-frequency component of the image signal extracted in the H direction.

When the difference between the amount Mh of change and the amount My of change is more than the difference threshold value Th1 and the amount Mh of change is more than the amount My of change, the calculating unit 33 calculates the sensitivity level value Bc of the B component using the following Expression 15. In addition, the calculating unit 33 calculates the sensitivity level value Rc of the R component using the following Expression 16.

$$Bc=(B2+B5)/2+(2\times G7-G2-G12)/2\times AA \qquad \text{[Expression 15]}$$

$$Rc=(R3+R4)/2+(2\times G7-G2-G12)/2\times AA \qquad \text{[Expression 16]}$$

Each of the (B2+B5)/2 term in Expression 15 and the (R3+R4)/2 term in Expression 16 corresponds to the extracted low-frequency component of the image signal, similarly to Expressions 11 and 12. The (2×G7×G2−G12)/2 term in Expression 15 and Expression 16 corresponds to the high-frequency component of the image signal extracted in the V direction.

A method of calculating the sensitivity level value of the insufficient color component is not limited to the method using Expressions 5 to 16. The calculating unit 33 may calculate the sensitivity level value of the insufficient color component using any other methods. For example, the calculating unit 33 may not perform a process of multiplying the high-frequency component to be added to the low-frequency component by the high-frequency addition coefficient.

Figure 6:
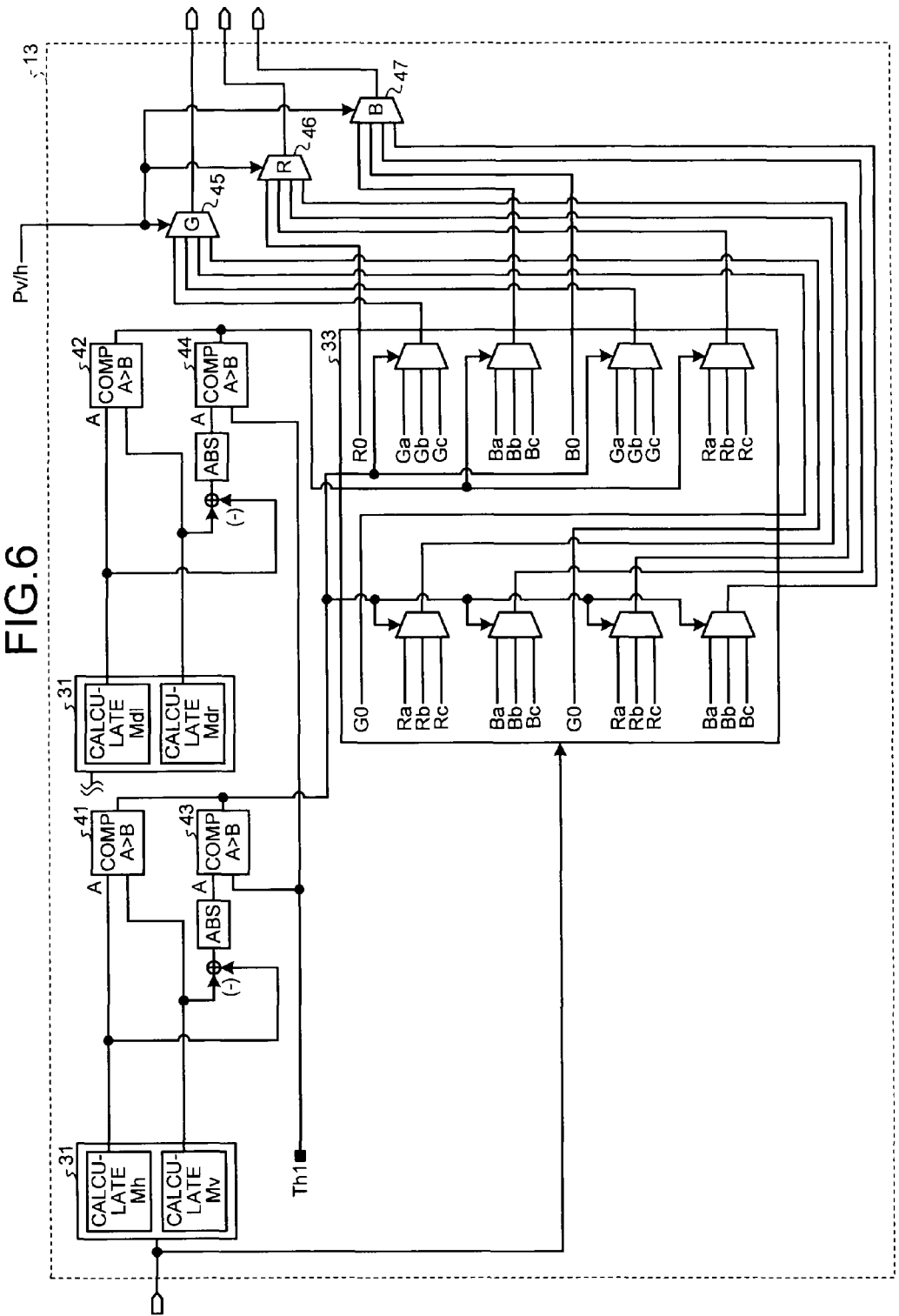
FIG. 6 is a block diagram illustrating an example of the circuit structure of the pixel interpolation unit.

FIG. 6 is a block diagram illustrating an example of the circuit structure of the pixel interpolation unit. A comparator (COMP) 41 of the change amount comparison unit 32 compares the amount Mh of change in the H direction and the amount Mv of change in the V direction which are calculated by the change amount calculating unit 31. When Mh>Mv is established, the COMP 41 outputs, for example, "1". When Mh>Mv is not established, the COMP 41 outputs, for example, "0".

A comparator (COMP) 43 compares the absolute value (ABS) of the difference between the amount Mh of change and the amount My of change with the predetermined difference threshold value Th1. When ABS>Th1 is established, the COMP 43 outputs, for example, "1". When ABS>Th1 is not established, the COMP 43 outputs, for example, "0".

When "0" is input from the COMP 43, the calculating unit 33 selects and outputs the sensitivity level values Ra, Ga, and Ba. When "1" is input from the COMP 43 and "0" is input from the COMP 41, the calculating unit 33 selects and outputs the sensitivity level values Rb, Gb, and Bb. When "1" is input from the COMP 43 and "1" is input from the COMP 41, the calculating unit 33 selects and outputs the sensitivity level values Rc, Gc, and Bc.

A comparator (COMP) 42 of the change amount comparison unit 32 compares the amount Mdl of change in the DL direction and the amount Mdr of change in the DR direction which are calculated by the change amount calculating unit 31. When Mdl>Mdr is established, the COMP 42 outputs, for example, "1". When Mdl>Mdr is not established, the COMP 42 outputs, for example, "0".

A comparator (COMP) 44 compares the absolute value (ABS) of the difference between the amount Mdl of change and the amount Mdr of change with the predetermined difference threshold value Th1. When ABS>Th1 is established, the COMP 44 outputs, for example, "1". When ABS>Th1 is not established, the COMP 44 outputs, for example, "0".

When "0" is input from the COMP 44, the calculating unit 33 selects and outputs the sensitivity level values Ra and Ba. When "1" is input from the COMP 44 and "0" is input from the COMP 43, the calculating unit 33 selects and outputs the sensitivity level values Rb and Bb. When "1" is input from the COMP 44 and "1" is input from the COMP 43, the calculating unit 33 selects and outputs the sensitivity level values Rc and Bc.

A G component selector 45, an R component selector 46, and a B component selector 47 identify the pixel of attention from a V/H synchronization pulse Pv/h and select a sensitivity level value corresponding to the pixel of attention. When the pixel of attention is a G pixel, the G component selector 45 selects the sensitivity level value G0 of the acquired color component of the pixel of attention. When the pixel of attention is an R pixel or a B pixel, the G component selector 45 selects any one of the sensitivity level values Ga, Gb, and Gc calculated by the calculating unit 33.

When the pixel of attention is an R pixel, the R component selector 46 selects the sensitivity level value R0 of the acquired color component of the pixel of attention. When the pixel of attention is a G pixel or a B pixel, the R component selector 46 selects any one of the sensitivity level values Ra, Rb, and Rc calculated by the calculating unit 33.

When the pixel of attention is a B pixel, the B component selector 47 selects the sensitivity level value B0 of the acquired color component of the pixel of attention. When the pixel of attention is an R pixel or a G pixel, the B component selector 47 selects any one of the sensitivity level values Ba, Bb, and Bc calculated by the calculating unit 33. The pixel interpolation unit 13 outputs the sensitivity level values selected by the selectors 45, 46, and 47.

In this embodiment, the pixel interpolation unit 13 extracts a high-frequency component, using the direction in which the amount of change in the sensitivity level value is small among a plurality of directions based on the pixel of attention as the direction in which there is little possibility that the correlation among the RGB color components will be broken. The pixel interpolation unit 13 adds the high-frequency component to prevent the deterioration of resolution and adds, to the low-frequency component, the high-frequency component in the direction in which the amount of change in the sensitivity level value is small to prevent a reduction in quality due to the breaking of the correlation.

When the difference between the amounts of change in two directions is small, the pixel interpolation unit 13 performs pixel interpolation using only the low-frequency component to prevent the influence of noise or a reduction in the accuracy of interpolation due to the addition of the high-frequency component. The circuit structure of the pixel interpolation unit 13 is not limited to that shown in FIG. 6, but it may be appropriately changed.

Figure 7:
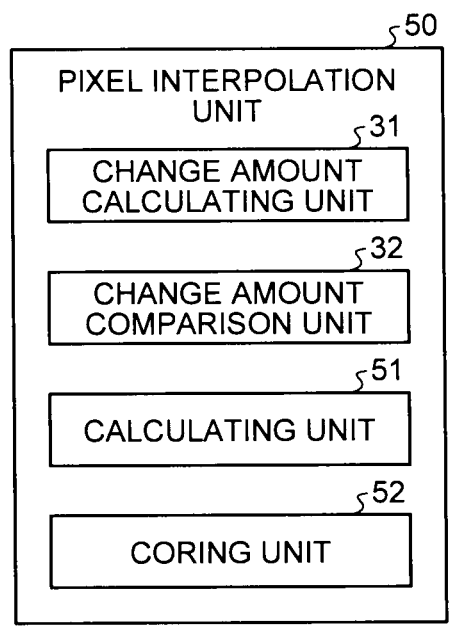
FIG. 7 is a block diagram illustrating the schematic structure of a pixel interpolation unit of an image processing apparatus according to a second embodiment.

FIG. 7 is a block diagram illustrating the schematic structure of a pixel interpolation unit of an image processing apparatus according to a second embodiment. In the second embodiment, the same components as those in the first embodiment are denoted by the same reference numerals and a description thereof will not be repeated. A pixel interpolation unit 50 includes a change amount calculating unit 31, a change amount comparison unit 32, a calculating unit 51, and a coring unit 52. The coring unit 52 performs a coring process on the amounts Mh, Mv, Mdl, and Mdr of change which are calculated by the change amount calculating unit 31. When the absolute value of a signal is less than a threshold value, the coring process suppresses the signals with a value that is equal to or less than the threshold value, thereby removing a noise component.

The coring unit 52 compares the amounts Mh, Mv, Mdl, and Mdr of change with a predetermined coring threshold value Th2. The amounts Mh, Mv, Mdl, and Mdr of change are less than the coring threshold value Th2, the coring unit 52 collectively changes the amounts Mh, Mv, Mdl, and Mdr of change to zero.

Next, an example of calculating the sensitivity level value of an insufficient color component when an R pixel is the pixel of attention will be described. It is assumed that the pixel of attention and the peripheral pixels thereof are arranged as shown in FIG. 4. During the calculation of the sensitivity level value of a G component, when both the amount Mh of change and the amount My of change are zero after the coring process, the calculating unit 51 performs linear interpolation on the sensitivity level values of the pixels of the same color which have the G component as the acquired color component among the peripheral pixels. Specifically, when both the amount Mh of change and the amount Mv of change are zero, the calculating unit 51 calculates the sensitivity level value Ga of the G component using Expression 5 described in the first embodiment.

When at least one of the amount Mh of change and the amount Mv of change is not zero after the coring process and the difference between the amount Mh of change and the amount Mv of change is less than the difference threshold value Th1, the calculating unit 51 adds the high-frequency components in the H direction and the V direction to the low-frequency component.

Specifically, when at least one of the amount Mh of change and the amount Mv of change is not zero and the difference between the amount Mh of change and the amount Mv of change is less than the difference threshold value Th1, the calculating unit 51 calculates the sensitivity level value Gd of the G component using the following Expression 17.

$$Gd=(G4+G6+G7+G9)/4+(4\times R5-R2-R4-R6-R8)/4\times AA \qquad \text{[Expression 17]}$$

In Expression 17, the (G4+G6+G7+G9)/4 term corresponds to the low-frequency component of the image signal extracted in the H direction and the V direction. The (4×R5−R2−R4−R6−R8)/4 term corresponds to the high-frequency component of the image signal extracted in the H direction and the V direction.

When at least one of the amount Mh of change and the amount Mv of change is not zero and the difference between the amount Mh of change and the amount Mv of change is more than the difference threshold value Th1, the calculating unit 51 adds, to the low-frequency component, the high-frequency component in the direction in which the amount of change is determined to be small by the comparison of the change amount comparison unit 32.

When the amount Mv of change is more than the amount Mh of change, the calculating unit 51 adds the high-frequency component in the H direction to the low-frequency component. Specifically, in this case, the calculating unit 51 calculates the sensitivity level value Gb of the G component using Expression 6 described in the first embodiment.

When the amount Mh of change is more than the amount Mv of change, the calculating unit 51 adds the high-frequency component in the V direction to the low-frequency component. Specifically, in this case, the calculating unit 51 calculates the sensitivity level value Gc of the G component using Expression 7 described in the first embodiment.

During the calculation of the sensitivity level value of the B component, when both the amount Mdl of change and the amount Mdr of change are zero after the coring process, the calculating unit 51 performs linear interpolation on the sensitivity level values of the pixels of the same color which have the B component as the acquired color component among the peripheral pixels. Specifically, when both the amount Mdl of change and the amount Mdr of change are zero, the calculating unit 51 calculates the sensitivity level value Ba of the B component using Expression 8 described in the first embodiment.

When at least one of the amount Mdl of change and the amount Mdr of change is not zero after the coring process and the difference between the amount Mdl of change and the amount Mdr of change is less than the difference threshold value Th1, the calculating unit 51 adds the high-frequency components in the DL direction and the DR direction to the low-frequency component.

Specifically, when at least one of the amount Mdl of change and the amount Mdr of change is not zero and the difference between the amount Mdl of change and the amount Mdr of change is less than the difference threshold value Th1, the calculating unit 51 calculates the sensitivity level value Bd of the B component using the following Expression 18.

$$Bd=(B1+B2+B3+B4)/4+(4\times R5-R1-R3-R7-R9)/4\times AA \qquad \text{[Expression 18]}$$

In Expression 18, the (B1+B2+B3+B4)/4 term corresponds to the low-frequency component of the image signal extracted in the DL direction and the DR direction. The (4×R5−R1−R3−R7−R9)/4 term corresponds to the high-frequency component of the image signal extracted in the DL direction and the DR direction.

When at least one of the amount Mdl of change and the amount Mdr of change is not zero and the difference between the amount Mdl of change and the amount Mdr of change is more than the difference threshold value Th1, the calculating unit 51 adds, to the low-frequency component, the high-frequency component in the direction in which the amount of change is determined to be small by the comparison of the change amount comparison unit 32.

When the amount Mdr of change is more than the amount Mdl of change, the calculating unit 51 adds the high-frequency component in the DL direction to the low-frequency component. Specifically, in this case, the calculating unit 51 calculates the sensitivity level value Bb of the B component using Expression 9 described in the first embodiment.

When the amount Mdl of change is more than the amount Mdr of change, the calculating unit 51 adds the high-frequency component in the DR direction to the low-frequency component. Specifically, in this case, the calculating unit 51 calculates the sensitivity level value Bc of the B component using Expression 10 described in the first embodiment.

The calculating unit 51 calculates the sensitivity level value of the R component when the B pixel is the pixel of attention, using the same method as that used to calculate the sensitivity level value of the B component when the R pixel is the pixel of attention.

Next, a case in which the G pixel is the pixel of attention will be described. It is assumed that the pixel of attention and the peripheral pixels thereof are arranged as shown in FIG. 5. During the calculation of the sensitivity level values of the B and R components, when both the amount Mh of change and the amount Mv of change are zero after the coring process, the calculating unit 51 performs a process of linearly interpolating the sensitivity level values of the pixels of the same color on each of the B component and the R component.

Specifically, when both the amount Mh of change and the amount Mv of change are zero, the calculating unit 51 calculates the sensitivity level value Ba of the B component using Expression 11 described in the first embodiment. In addition, the calculating unit 51 calculates the sensitivity level value Ra of the R component using Expression 12 described in the first embodiment.

When at least one of the amount Mh of change and the amount Mv of change is not zero after the coring process and the difference between the amount Mh of change and the amount Mv of change is less than the difference threshold value Th1, the calculating unit 51 adds the high-frequency components in the H direction and the V direction to the low-frequency component.

Specifically, when at least one of the amount Mh of change and the amount MY of change is not zero and the difference between the amount Mh of change and the amount Mv of change is less than the difference threshold value Th1, the calculating unit 51 calculates the sensitivity level value Bd of the B component using the following Expression 19. In addition, the calculating unit 51 calculates the sensitivity level value Rd of the R component using the following Expression 20.

$$Bd = (B2+B5)/2 + (4 \times G7 - G2 - G6 - G8 - G12)/4 \times AA \quad \text{[Expression 19]}$$

$$Rd = (R3+R4)/2 + (4 \times G7 - G2 - G6 - G8 - G12)/4 \times AA \quad \text{[Expression 20]}$$

In Expression 19, the (B2+B5)/2 term corresponds to the extracted low-frequency component of the image signal. In Expression 20, the (R3+R4)/2 term corresponds to the extracted low-frequency component of the image signal. In Expression 19 and Expression 20, the (4×G7−G2−G6−G8−G12)/2 term corresponds to the high-frequency component of the image signal extracted in the H direction and the V direction.

When at least one of the amount Mh of change and the amount Mv of change is not zero and the difference between the amount Mh of change and the amount Mv of change is more than the difference threshold value Th1, the calculating unit 51 adds, to the low-frequency component, the high-frequency component in the direction in which the amount of change is determined to be small by the comparison of the change amount comparison unit 32.

When the amount Mv of change is more than the amount Mh of change, the calculating unit 51 adds the high-frequency component in the H direction to the low-frequency component. Specifically, in this case, the calculating unit 51 calculates the sensitivity level value Bb of the B component using Expression 13 described in the first embodiment. In addition, the calculating unit 51 calculates the sensitivity level value Rb of the R component using Expression 14 described in the first embodiment.

When the amount Mh of change is more than the amount Mv of change, the calculating unit 51 adds the high-frequency component in the V direction to the low-frequency component. Specifically, in this case, the calculating unit 51 calculates the sensitivity level value Bc of the B component using Expression 15 described in the first embodiment. In addition, the calculating unit 51 calculates the sensitivity level value Rc of the R component using Expression 16 described in the first embodiment.

Figure 8:
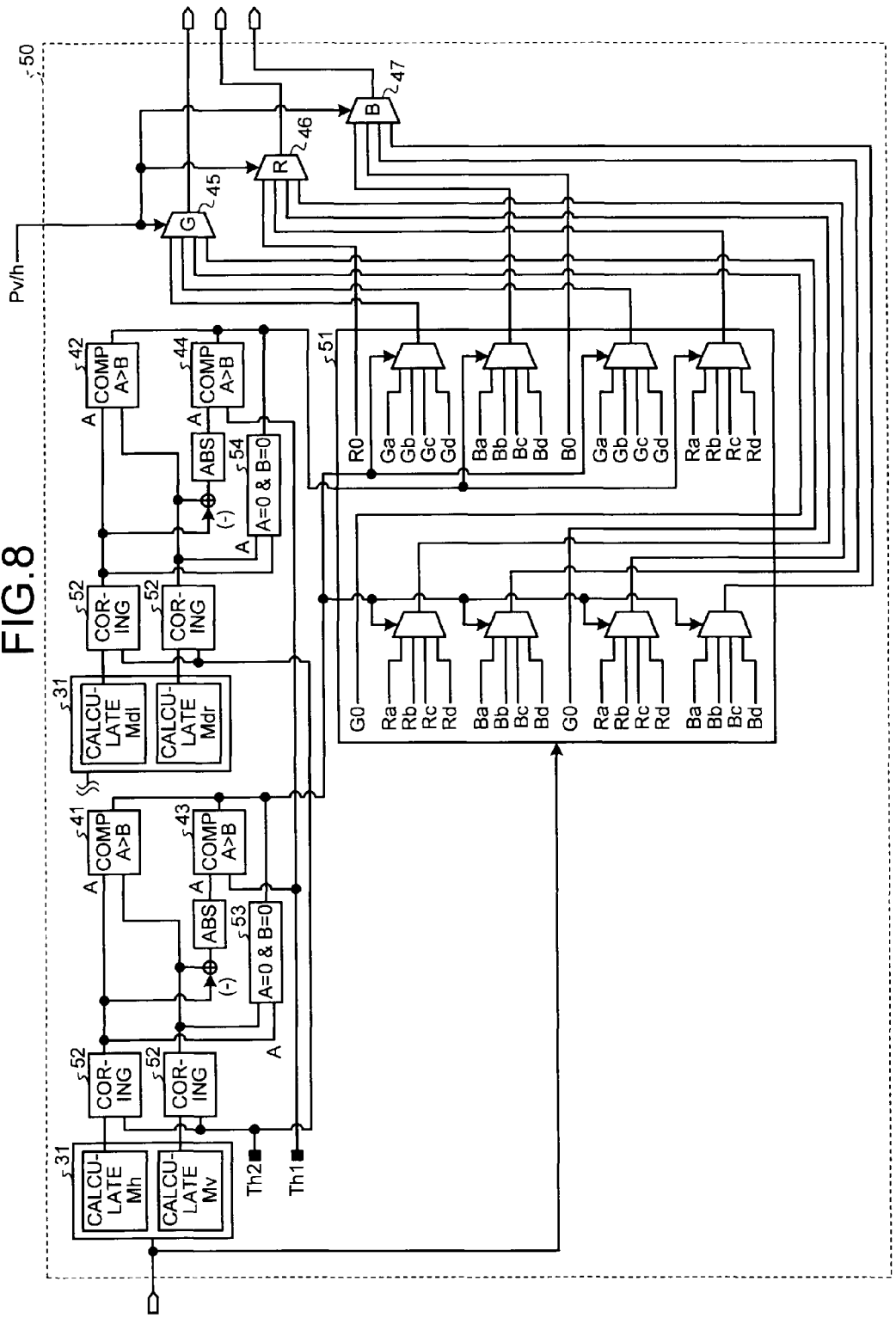
FIG. 8 is a block diagram illustrating an example of the circuit structure of the pixel interpolation unit.

FIG. 8 is a block diagram illustrating an example of the circuit structure of the pixel interpolation unit. A COMP 41 compares the amount Mh of change and the amount My of change which have been subjected to the coring process of the coring unit 52. When both the amount Mh of change and the amount Mv of change are zero, an AND circuit 53 outputs, for example, "1". When at least one of the amount Mh of change and the amount Mv of change is not zero, the AND circuit 53 outputs, for example, "0".

A COMP 42 compares the amount Mdl of change and the amount Mdr of change which have been subjected to the coring process of the coring unit 52. When both the amount Mdl of change and the amount Mdr of change are zero, the AND circuit 54 outputs, for example, "1". When at least one of the amount Mdl of change and the amount Mdr of change is not zero, the AND circuit 54 outputs, for example, "0".

When "1" is input from the AND circuit 53, the calculating unit 51 selects and outputs the sensitivity level values Ra, Ga, and Ba. When "0" is input from the AND circuit 53 and "0" is input from the COMP 43, the calculating unit 51 selects and outputs the sensitivity level values Rd, Gd, and Bd.

When "0", "1", and "0" are respectively input from the AND circuit 53, the COMP 43, and the COMP 41, the calculating unit 51 selects and outputs the sensitivity level values Rb, Gb, and Bb. When "0", "1", and "1" are respectively input from the AND circuit 53, the COMP 43, and the COMP 41, the calculating unit 51 selects and outputs the sensitivity level values Rc, Gc, and Bc.

When "1" is input from an AND circuit 54, the calculating unit 51 selects and outputs the sensitivity level values Ra and Ba. When "0" is input from the AND circuit 54 and "0" is input from a COMP 44, the calculating unit 51 selects and outputs the sensitivity level values Rd and Bd.

When "0", "1", and "0" are respectively input from the AND circuit 54, the COMP 44, and the COMP 42, the calculating unit 51 selects and outputs the sensitivity level values Rb and Bb. When "0", "1", and "1" are respectively input from the AND circuit 54, the COMP 44, and the COMP 42, the calculating unit 51 selects and outputs the sensitivity level values Rc and Bc.

When the pixel of attention is the R pixel or the B pixel, a G component selector 45 selects any one of the sensitivity level values Ga, Gb, Gc, and Gd calculated by the calculating unit 51. When the pixel of attention is the G pixel or the B pixel, an R component selector 46 selects any one of the sensitivity level values Ra, Rb, Rc, and Rd calculated by the calculating unit 51. When the pixel of attention is the R pixel or the G pixel, a B component selector 47 selects any one of the sensitivity level values Ba, Bb, Bc, and Bd calculated by the calculating unit 51. The pixel interpolation unit 50 outputs the sensitivity level values selected by the selectors 45, 46, and 47.

In this embodiment, similarly to the first embodiment, it is possible to prevent the deterioration of resolution and a reduction in quality due to the breaking of the correlation among the color components. In this embodiment, the pixel interpolation unit 50 performs the coring process to easily determine a flat portion in which a variation in the signal level is small. The coring process makes it possible to effectively reduce the influence of aliasing distortion, similarly to the noise component. In particular, the determination based on the comparison between the difference between the amounts of change and the difference threshold value is effective for a mesh-shaped object.

Figure 9:
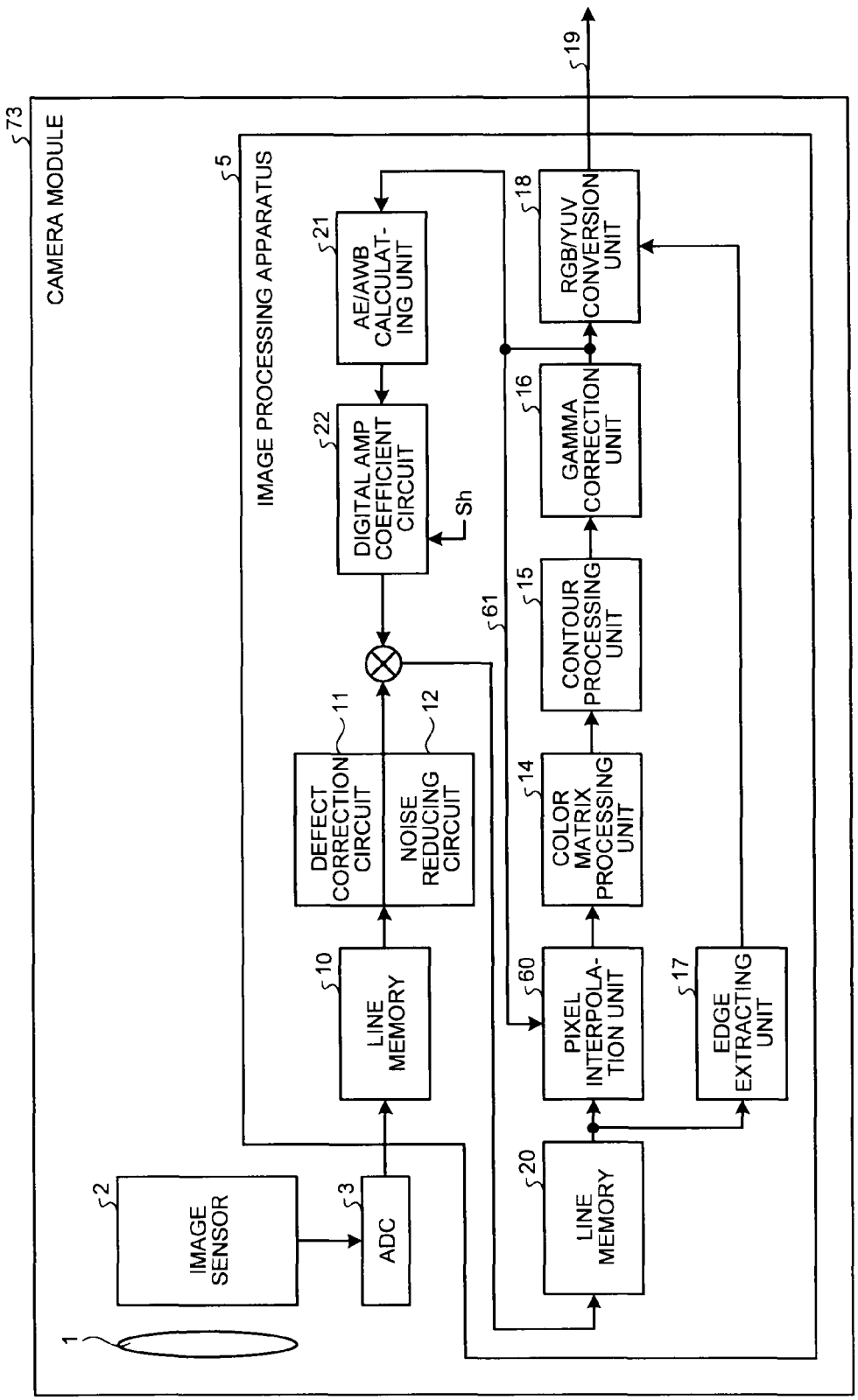
FIG. 9 is a block diagram illustrating the structure of a camera module including an image processing apparatus according to a third embodiment.

FIG. 9 is a block diagram illustrating the structure of a camera module including an image processing apparatus according to a third embodiment. In the third embodiment, the same components as those in the first and second embodiments are denoted by the same reference numerals and a description thereof will not be repeated. A camera module 73 includes an imaging lens 1, an image sensor 2, an ADC 3, and an image processing apparatus 5. An AE/AWB calculating circuit 21 provided in the image processing apparatus 5 generates brightness information 61 to which the calculation result of an AE adjustment coefficient is reflected and outputs the brightness information 61 to the pixel interpolation unit 60.

Figure 10:
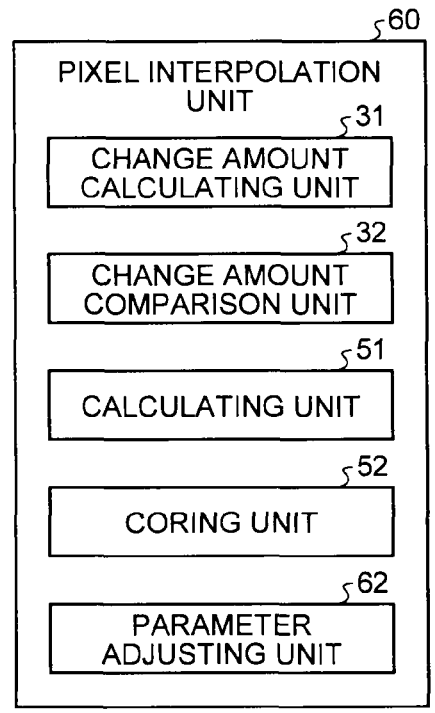
FIG. 10 is a block diagram illustrating the schematic structure of a pixel interpolation unit.

FIG. 10 is a block diagram illustrating the schematic structure of a pixel interpolation unit. A pixel interpolation unit 60 includes a change amount calculating unit 31, a change amount comparison unit 32, a calculating unit 51, a coring unit 52, and a parameter adjusting unit 62. The parameter adjusting unit 62 adjusts each parameter of a high-frequency addition coefficient AA, a difference threshold value Th1, and a coring threshold value Th2.

Figure 11:
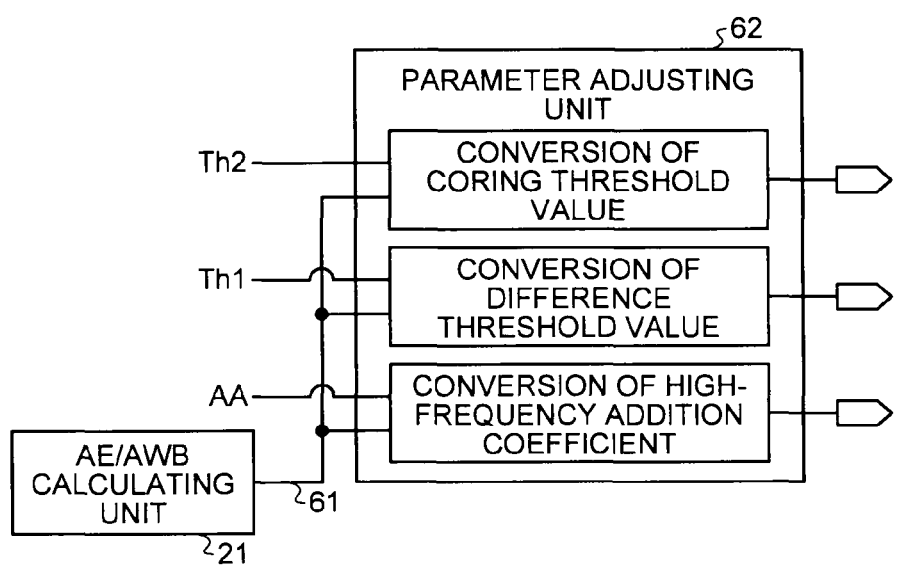
FIG. 11 is a diagram illustrating the adjustment of parameters by the parameter adjusting unit.

FIG. 11 is a diagram illustrating the adjustment of the parameters by the parameter adjusting unit. The parameter adjusting unit 62 converts each of the high-frequency addition coefficient AA, the difference threshold value Th1, and the coring threshold value Th2 according to the brightness information 61 during image capture which is input from the AE/AWB calculating circuit 21.

Figure 12:
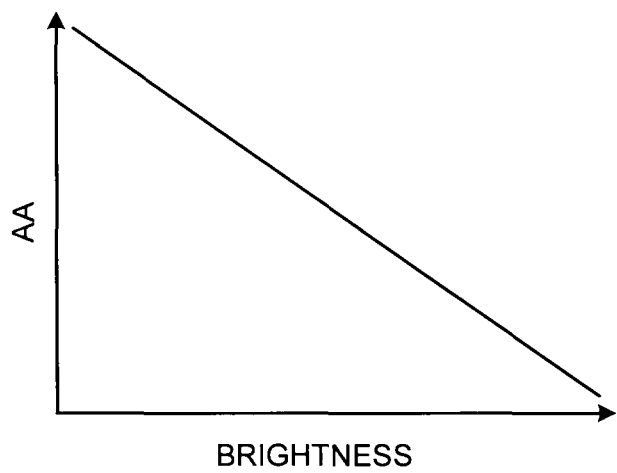
FIG. 12 is a diagram illustrating the conversion of a high-frequency addition coefficient by the parameter adjusting unit.

FIG. 12 is a diagram illustrating the conversion of the high-frequency addition coefficient by the parameter adjusting unit. In the graph shown in FIG. 12, the vertical axis indicates the high-frequency addition coefficient AA and the horizontal axis indicates brightness. In FIG. 12, it is assumed that brightness is reduced from the left to the right.

The parameter adjusting unit 62 converts the high-frequency addition coefficient AA such that, as the brightness obtained from the brightness information 61 is reduced, the high-frequency addition coefficient AA is reduced. The parameter adjusting unit 62 converts the high-frequency addition coefficient AA such that the high-frequency addition coefficient AA and the brightness have, for example, a linear function relation therebetween.

The parameter adjusting unit 62 outputs the converted high-frequency addition coefficient AA to the calculating unit 51. The parameter adjusting unit 62 adjusts the high-frequency addition coefficient AA according to the brightness information 61 to prevent the deterioration of the S/N ratio due to the high-frequency component when a noise component is likely to be generated in the image signal in a low-luminance imaging environment.

The parameter adjusting unit 62 converts the difference threshold value Th1 such that, as the brightness obtained from the brightness information 61 is reduced, the difference threshold value Th1 increases. The parameter adjusting unit 62 converts the coring threshold value Th2 such that, as the brightness obtained from the brightness information 61 is reduced, the coring threshold value Th2 increases. The parameter adjusting unit 62 converts the difference threshold value Th1 and the coring threshold value Th2 such that they have, for example, a linear function relation therebetween, similarly to the high-frequency addition coefficient AA.

The parameter adjusting unit 62 outputs the converted difference threshold value Th1 to the change amount comparison unit 32. The parameter adjusting unit 62 outputs the converted coring threshold value Th2 to the coring unit 52. The parameter adjusting unit 62 adjusts the difference threshold value Th1 and the coring threshold value Th2 according to the brightness information 61 to prevent the deterioration of the S/N ratio due to the high-frequency component in a low-luminance imaging environment.

In this embodiment, similarly to the first embodiment, it is possible to prevent the deterioration of resolution and a reduction in quality due to the breaking of the correlation among the color components. In addition, in this embodiment, the pixel interpolation unit 60 can adjust the parameters according to the brightness information 61 to prevent the deterioration of the S/N ratio due to the high-frequency component.

In this embodiment, the parameter adjusting unit 62 adjusts all of the high-frequency addition coefficient AA, the difference threshold value Th1, and the coring threshold value Th2. However, this embodiment is not limited thereto. The parameter adjusting unit 62 may adjust at least one of the high-frequency addition coefficient AA, the difference threshold value Th1, and the coring threshold value Th2.

The image processing apparatuses according to the first, second, and third embodiments, may be applied to electronic apparatuses other than the digital camera. For example, the image processing apparatuses may be applied to mobile phones with a camera.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An image processing apparatus comprising:
a pixel interpolation unit that performs an interpolation process on a sensitivity level value of an acquired color component of each pixel in an image signal which is acquired by an imaging operation to generate a sensitivity level value of an insufficient color component of each pixel, wherein the pixel interpolation unit includes:

a change amount calculating unit that calculates the amounts of change in the sensitivity level values of the acquired color components in a pixel of attention in which the sensitivity level value of the insufficient color component is generated and peripheral pixels which are disposed in the periphery of the pixel of attention in each direction based on the pixel of attention;

a change amount comparison unit that compares the amounts of change calculated by the change amount calculating unit in two directions; and a calculating unit that adds a first frequency band component of the image signal and a second frequency band component which is in a frequency band higher than the first frequency band component to generate the sensitivity level value of the insufficient color component of the pixel of attention, the two directions in which the change amount comparison unit compares the amounts of change are predetermined according to the acquired color component of the pixel of attention and the insufficient color component whose sensitivity level value is calculated, the calculating unit adds, to the first frequency band component, the second frequency band component in one of the two directions in which the amount of change is determined to be small by the comparison of the change amount comparison unit, the change amount calculating unit calculates the amounts of change in four directions for each pixel, the four directions are a first direction, a second direction vertical to the first direction, a third direction which is inclined with respect to the first direction and the second direction, and a fourth direction which is inclined with respect to the first direction and the second direction and is different from the third direction in a two-dimensional space in which the pixels are arranged, and the change amount comparison unit compares the amounts of change in two directions which are predetermined according to the acquired color component and the insufficient color component of the pixel of attention, among the four directions.

2. The image processing apparatus according to claim 1, wherein, when a difference between the amounts of change in the two directions is less than a predetermined difference threshold value, the calculating unit performs linear interpolation on the sensitivity level values of the pixels of the same color which have the same color component as the insufficient color component of the pixel of attention as the acquired color component among the peripheral pixels.

3. The image processing apparatus according to claim 1, wherein the calculating unit performs linear interpolation on the sensitivity level values of the pixels of the same color which have the same color component as the insufficient color component of the pixel of attention as the acquired color component among the peripheral pixels, thereby calculating the first frequency band component.

4. The image processing apparatus according to claim 1, wherein the pixel interpolation unit further includes a coring unit that performs a coring process on the amounts of change calculated by the change amount calculating unit, and the change amount comparison unit compares the amounts of change subjected to the coring process of the coring unit.

5. The image processing apparatus according to claim 1, wherein the calculating unit multiplies the second frequency band component by a high-frequency addition coefficient for adjusting a weight of the second frequency band component on the first frequency band component.

6. The image processing apparatus according to claim 5, wherein the pixel interpolation unit further includes a parameter adjusting unit that adjusts the high-frequency addition coefficient according to brightness information during image capture.

7. The image processing apparatus according to claim 1, wherein when the acquired color component of the pixel of attention is red or blue, and the insufficient color component whose sensitivity level value is calculated is green, the two directions are horizontal and vertical directions, when the acquired color component of the pixel of attention is red or blue, and the insufficient color component whose sensitivity level value is calculated is blue or red, the two directions are diagonal to both the horizontal and vertical directions, and when the acquired color component of the pixel of attention is green, and the insufficient color component whose sensitivity level value is calculated is red or blue, the two directions are the horizontal and vertical directions.

8. An image processing method comprising:

a pixel interpolation process that is performed by an interpolation unit on a sensitivity level value of an acquired color component of each pixel in an image signal which is acquired by an imaging operation to generate a sensitivity level value of an insufficient color component of each pixel, wherein the pixel interpolation process includes:

calculating the amounts of change in the sensitivity level values of the acquired color components in a pixel of attention in which the sensitivity level value of the insufficient color component is generated and peripheral pixels which are disposed in the periphery of the pixel of attention in each direction based on the pixel of attention;

comparing the amounts of change in two directions which are predetermined according to the acquired color component of the pixel of attention and the insufficient color component whose sensitivity level value is calculated;

adding a first frequency band component of the image signal and a second frequency band component which is in a frequency band higher than the first frequency band component to generate the sensitivity level value of the insufficient color component of the pixel of attention; and adding, to the first frequency band component, the second frequency band component in one of the two directions in which the amount of change is determined to be small as the comparison result of the amounts of change, the amounts of change in four directions are calculated for each pixel, the four directions are in a first direction, a second direction vertical to the first direction, a third direction which is inclined with respect to the first direction and the second direction, and a fourth direction which is inclined with respect to the first direction and the second direction and is different from the third direction in a two-dimensional space in which the pixels are arranged, and the amounts of change are compared in two directions which are predetermined according to the acquired color component and the insufficient color component of the pixel of attention, among the four directions.

9. The image processing method according to claim 8, wherein, when a difference between the amounts of change in the two directions is less than a predetermined difference threshold value, linear interpolation is performed on the sensitivity level values of the pixels of the same color which have the same color component as the insufficient color component of the pixel of attention as the acquired color component among the peripheral pixels.

10. The image processing method according to claim 8, wherein linear interpolation is performed on the sensitivity level values of the pixels of the same color which have the same color component as the insufficient color component of the pixel of attention as the acquired color component among the peripheral pixels, thereby calculating the first frequency band component.

11. The image processing method according to claim 8, wherein the pixel interpolation process further includes performing a coring process on the amounts of change, and the amounts of change subjected to the coring process are compared.

12. The image processing method according to claim 8, wherein the second frequency band component is multiplied by a high-frequency addition coefficient for adjusting a weight of the second frequency band component on the first frequency band component.

13. The image processing method according to claim 12, wherein the pixel interpolation process further includes adjusting the high-frequency addition coefficient according to brightness information during image capture.

14. The image processing method according to claim 8, wherein when the acquired color component of the pixel of attention is red or blue, and the insufficient color component whose sensitivity level value is calculated is green, the two directions are horizontal and vertical directions, when the acquired color component of the pixel of attention is red or blue, and the insufficient color component whose sensitivity level value is calculated is blue or red, the two directions are diagonal to both the horizontal and vertical directions, and when the acquired color component of the pixel of attention is green, and the insufficient color component whose sensitivity level value is calculated is red or blue, the two directions are the horizontal and vertical directions.

15. A camera module comprising:

an imaging lens that receives light from an object and forms an object image;

an image sensor that captures the object image; and an image processing apparatus that processes an image signal acquired by the image sensor, wherein the image processing apparatus includes:

a pixel interpolation unit that performs an interpolation process on a sensitivity level value of an acquired color component of each pixel in the image signal which is acquired by an imaging operation to generate a sensitivity level value of an insufficient color component of each pixel, the pixel interpolation unit includes:

a change amount calculating unit that calculates the amounts of change in the sensitivity level values of the acquired color components in a pixel of attention in which the sensitivity level value of the insufficient color component is generated and peripheral pixels which are disposed in the periphery of the pixel of attention in each direction based on the pixel of attention;

a change amount comparison unit that compares the amounts of change calculated by the change amount calculating unit in two directions; and a calculating unit that adds a first frequency band component of the image signal and a second frequency band component which is in a frequency band higher than the first frequency band component to generate the sensitivity level value of the insufficient color component of the pixel of attention, the two directions in which the change amount comparison unit compares the amounts of change are predetermined according to the acquired color component of the pixel of attention and the insufficient color component whose sensitivity level value is calculated, the calculating unit adds, to the first frequency band component, the second frequency band component in one of the two directions in which the amount of change is determined to be small by the comparison of the change amount comparison unit, the change amount calculating unit calculates the amounts of change in four directions for each pixel, the four directions are a first direction, a second direction vertical to the first direction, a third direction which is inclined with respect to the first direction and the second direction, and a fourth direction which is inclined with respect to the first direction and the second direction and is different from the third direction in a two-dimensional space in which the pixels are arranged, and the change amount comparison unit compares the amounts of change in two directions which are predetermined according to the acquired color component and the insufficient color component of the pixel of attention, among the four directions.

16. The camera module according to claim 15, wherein, when a difference between the amounts of change in the two directions is less than a predetermined difference threshold value, the calculating unit performs linear interpolation on the sensitivity level values of the pixels of the same color which have the same color component as the insufficient color component of the pixel of attention as the acquired color component among the peripheral pixels.

17. The camera module according to claim 15, wherein the calculating unit performs linear interpolation on the sensitivity level values of the pixels of the same color which have the same color component as the insufficient color component of the pixel of attention as the acquired color component among the peripheral pixels, thereby calculating the first frequency band component.

18. The camera module according to claim 15, wherein the pixel interpolation unit further includes a coring unit that performs a coring process on the amounts of change calculated by the change amount calculating unit, and the change amount comparison unit compares the amounts of change subjected to the coring process of the coring unit.

19. The camera module according to claim 15,
wherein the calculating unit multiplies the second frequency band component by a high-frequency addition coefficient for adjusting a weight of the second frequency band component on the first frequency band component.

20. The camera module according to claim 19,
wherein the pixel interpolation unit further includes a parameter adjusting unit that adjusts the high-frequency addition coefficient according to brightness information during image capture.

* * * * *